US008916488B2

(12) United States Patent
Ishimine et al.

(10) Patent No.: US 8,916,488 B2
(45) Date of Patent: Dec. 23, 2014

(54) SLIDING MEMBER, MANUFACTURING METHOD THEREOF, MECHANICAL SEAL RING USING SLIDING MEMBER AND MECHANICAL SEAL USING MECHANICAL SEAL RING

(75) Inventors: Yuusaku Ishimine, Kirishima (JP); Kazuaki Takigawa, Kirishima (JP)

(73) Assignee: Kyocera Corporation, Kyoto (JP)

( * ) Notice: Subject to any disclaimer, the term of this patent is extended or adjusted under 35 U.S.C. 154(b) by 936 days.

(21) Appl. No.: 12/447,649

(22) PCT Filed: Oct. 30, 2007

(86) PCT No.: PCT/JP2007/071155
§ 371 (c)(1),
(2), (4) Date: Apr. 28, 2009

(87) PCT Pub. No.: WO2008/053903
PCT Pub. Date: May 8, 2008

(65) Prior Publication Data
US 2010/0004115 A1    Jan. 7, 2010

(30) Foreign Application Priority Data

Oct. 30, 2006 (JP) .................................. 2006-293577

(51) Int. Cl.
*C04B 35/565* (2006.01)
*C04B 35/64* (2006.01)
*C04B 38/00* (2006.01)
*C04B 38/06* (2006.01)
*F16J 15/34* (2006.01)
*C04B 111/20* (2006.01)
*C04B 111/00* (2006.01)

(52) U.S. Cl.
CPC ............. *F16J 15/3496* (2013.01); *C04B 38/00* (2013.01); *C04B 38/067* (2013.01); *C04B 2235/3826* (2013.01); *C04B 2235/3821* (2013.01); *C04B 35/565* (2013.01); *C04B 2111/2084* (2013.01); *C04B 2111/00353* (2013.01)
USPC ............................................... 501/90; 264/43

(58) Field of Classification Search
USPC ..................... 501/80, 81, 82, 88, 92, 154, 90; 423/345, 439
See application file for complete search history.

(56) References Cited

U.S. PATENT DOCUMENTS 4,777,152 A * 10/1988 Tsukada .......................... 501/80
4,777,153 A * 10/1988 Sonuparlak et al. ............ 501/82

(Continued)

FOREIGN PATENT DOCUMENTS

JP    57-004710    1/1982
JP    09-132478    5/1997

(Continued)

OTHER PUBLICATIONS

Machine translation of JP 2002-201070.*

(Continued)

*Primary Examiner* — Jun Li
(74) *Attorney, Agent, or Firm* — Volpe and Koenig, P.C.

(57) ABSTRACT

A sliding member having a sliding surface comprising a silicon carbide sintered body having a primary phase comprising mainly silicon carbide, and a subphase having a different composition from the primary phase and containing at least boron, silicon and carbon. The ratio of pores having a roundness of 6 μm or less and a pore diameter of 10 to 60 μm with respect to all pores having a pore diameter of 10 μm or more in the sliding surface is 60% or more. This enables retention of good seal properties even in a long-term continuous use. The subphase in the silicon carbide sintered body is preferably granular crystal phases dotted among a plurality of the primary phases. This provides excellent lubricating liquid holding performance as well as excellent thermal conductivity and excellent thermal shock resistance properties.

6 Claims, 7 Drawing Sheets

(56) References Cited

U.S. PATENT DOCUMENTS

| | | | | |
|---|---|---|---|---|
| 5,034,355 A | * | 7/1991 | Tani et al. | 501/92 |
| 5,080,378 A | * | 1/1992 | Kagawa | 277/404 |
| 5,395,807 A | * | 3/1995 | Divakar et al. | 501/88 |
| 5,589,428 A | * | 12/1996 | Divakar et al. | 501/88 |
| 5,635,430 A | * | 6/1997 | Divakar et al. | 501/90 |
| 5,762,895 A | * | 6/1998 | Schwetz et al. | 423/345 |
| 5,834,387 A | * | 11/1998 | Divakar et al. | 501/88 |
| 2005/0181197 A1 | | 8/2005 | Masuyama et al. | 428/304.4 |
| 2005/0250640 A1 | | 11/2005 | Meier et al. | |

FOREIGN PATENT DOCUMENTS

| | | |
|---|---|---|
| JP | 09-132479 | 5/1997 |
| JP | 2002-147617 | 5/2002 |
| JP | 2002-201070 | 7/2002 |
| JP | 2002274953 A | 9/2002 |
| JP | 2005-179100 | 7/2005 |
| JP | 2006-036624 | 2/2006 |
| JP | 2007084368 A | 4/2007 |
| JP | 2007223890 A | 9/2007 |

OTHER PUBLICATIONS

Extended European search report dated Nov. 29, 2012 issued in corresponding European application 07830889.7.

European office action dated Jun. 13, 2014 issued in corresponding European application 07830889.7.

* cited by examiner (a)

(b)

SLIDING MEMBER, MANUFACTURING METHOD THEREOF, MECHANICAL SEAL RING USING SLIDING MEMBER AND MECHANICAL SEAL USING MECHANICAL SEAL RING

CROSS-REFERENCE TO THE RELATED APPLICATIONS

This application is a national stage of international application No. PCT/JP2007/071155 filed on Oct. 30, 2007, which also claims the benefit of priority under 35 USC 119 to Japanese Patent Application No. 2006-293577 filed Oct. 30, 2006, the entire contents of which are incorporated herein by reference.

TECHNICAL FIELD

The present invention relates to a sliding member constructed of a silicon carbide sintered body, such as mechanical seal rings used in the mechanical seals (shaft sealing devices) of pumps for fish holding tanks, automobile cooling water pumps, refrigerators and the like. The invention also relates to a method of manufacturing the sliding member, and a mechanical seal ring using the sliding member and a mechanical seal using the mechanical seal ring.

BACKGROUND ART

A sliding member using a ceramic sintered body is being applied by use of the wear resistance thereof to mechanical seal rings used in, for example, the mechanical seal of fluid equipments. The mechanical seal is one of shaft sealing devices used in the rotating parts of various types of machines with the aim of a complete fluid sealing. The mechanical seal ring is made up of a rotary ring that slidingly contacts the rotary parts of the various types of machines and is movable in the axial direction in accordance with the wear of a sliding surface, and a stationary ring that does not move. The mechanical seal ring operates to restrict the fluid leakage at the end face substantially vertical to the relative rotating shaft.

As the mechanical seal ring, a carbon material, a cemented carbide, a silicon carbide sintered body or an alumina sintered body is used mainly. In the recent years, a (porous) silicon carbide sintered body is often used which has a high hardness and high corrosion resistance and also has a low coefficient of friction during sliding and excellent smoothness.

Patent document 1 has proposed a porous silicon carbide sintered body with uniformly dispersedly arranged independent pores having a mean pore diameter of 10 to 40 µm and having a porosity of 3% to 10%. FIG. 7 is a microphotograph showing the pores existing in the porous silicon carbide sintered body proposed by the patent document 1.

In a sliding member using the silicon carbide sintered body proposed by the patent document 1, though the wear resistance thereof has been somewhat improved, a pore forming agent, such as polystyrene, for forming pores is added into the raw material powder thereof.

However, the pore forming agent is liable to aggregate. As seen in FIG. 7, this leads to a high ratio of communicating pores in which a plurality of pores are communicated with each other so as to form a long slender shape having a large maximum diameter, resulting in a high ratio of the communicating pores with respect to the pores contributing to the improvement of sliding characteristics, and having a pore diameter of 10 µm or more. Therefore, a long-term continuous use of the sliding member has caused the problem that seal properties may rapidly deteriorate because stress concentrates during sliding at the periphery of the contour forming the communicating pores, thus being susceptible to degranulation.

Patent Document 1: Japanese Unexamined Patent Publication No. 2002-147617

DISCLOSURE OF THE INVENTION

Technical Problem

An advantage of the present invention is to provide a sliding member, such as a mechanical seal ring, capable of maintaining excellent seal properties even in a continuous long-term use.

Other advantage of the present invention is to provide a sliding member, such as a mechanical seal ring, having excellent lubricating liquid holding performance, as well as excellent thermal conductivity and excellent thermal shock resistance.

Technical Solution

The sliding member of the invention has a sliding surface comprising a silicon carbide sintered body having a primary phase and a subphase, wherein the primary phase comprises silicon carbide as a main component, and the subphase has a different composition from the primary phase and contains boron, silicon and carbon. The ratio of pores having a roundness of 6 µm or less and a pore diameter of 10 to 60 µm with respect to all pores having a pore diameter of 10 µm or more in the sliding surface is 60% or more.

The subphase in the silicon carbide sintered body is preferably granular crystal phases dotted among a plurality of the primary phases.

The "sliding surface" in the invention means a surface where sliding members are opposed to each other and rub each other. Besides the sliding surface in the initial state thereof, a surface newly developed due to wear during sliding is also included. Like the sliding surface, the portions other than the sliding surface may comprise a primary phase comprising mainly silicon carbide, and a subphase containing boron, silicon and carbon. There is no problem if the primary phase and the subphase differ in composition.

Advantageous Effects

The sliding member of the invention has the sliding surface constructed of the silicon carbide sintered body having the primary phase composed mainly of silicon carbide, and the subphase having a different composition from the primary phase and containing at least boron, silicon and carbon. The ratio of pores having a roundness of 6 µm or less and a pore diameter of 10 to 60 µm with respect to all pores having a pore diameter of 10 µm or more in the sliding surface is 60% or more. This diminishes extremely large pores that deteriorate seal properties, and also diminishes communicating pores, thereby facilitating a long-term retention of seal properties.

Especially, when the subphase in the silicon carbide sintered body is the granular crystal phase dotted among a plurality of the primary phases, the movement of phonons as the carrier of thermal conduction is hardly restricted, thereby improving thermal conductivity and thermal shock resistance. As a result, the heat generation due to friction can be lowered to diminish the wear of the sliding surface.

BEST MODE FOR CARRYING OUT THE INVENTION

Figure 1:
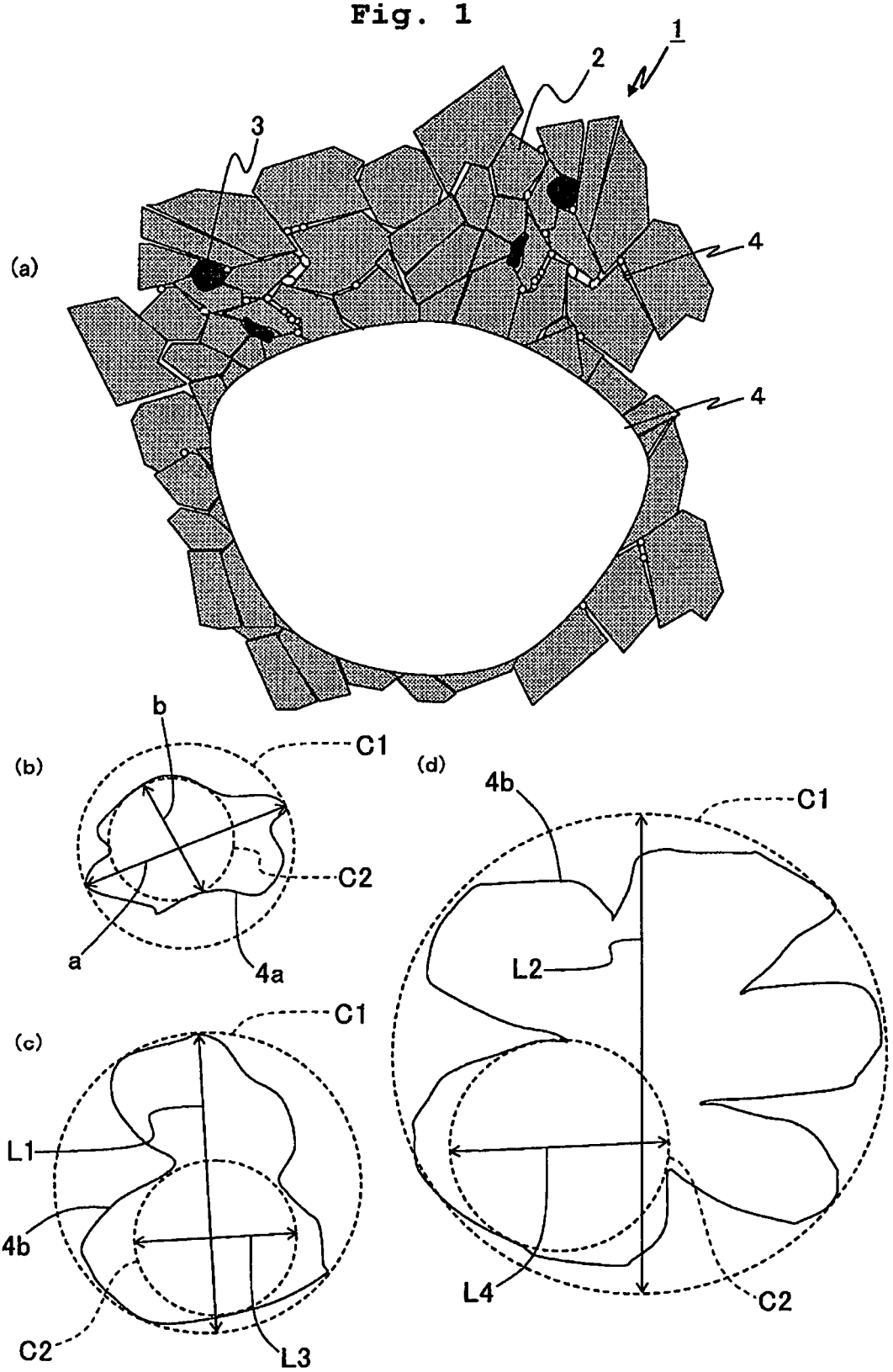
FIG. 1(a) is a schematic explanatory drawing showing a sliding surface of a sliding member according to a first preferred embodiment of the invention.
FIG. 1(b) is an enlarged schematic explanatory drawing showing spherical pores in the sliding surface.
FIGS. 1(c) and 1(d) are enlarged schematic explanatory drawings showing communicating pores in the sliding surface, respectively.
Figure 2:
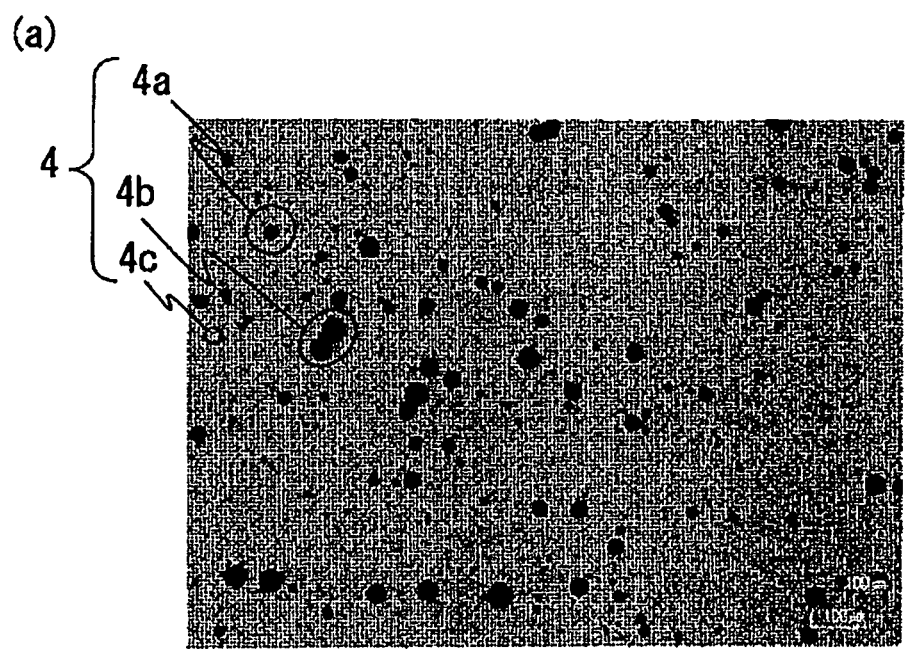
FIGS. 2(a) and 2(b) are microphotographs showing the states of pores of a silicon carbide sintered body in the sliding member according to the first preferred embodiment of the invention, specifically showing the case where the porosity is 6% and the case where the porosity is 10%, respectively.
Figure 2:
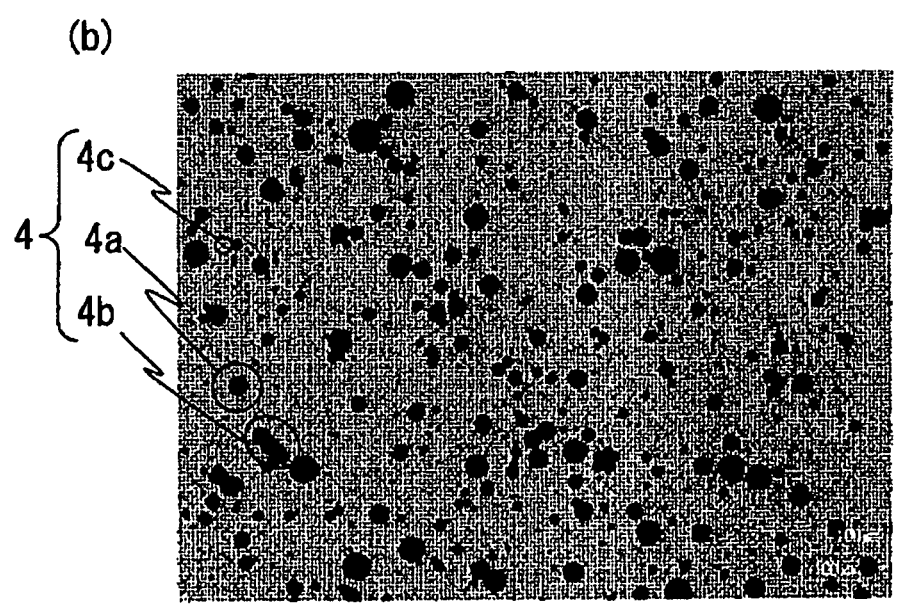

A first preferred embodiment of the invention will be described below in detail with reference to the accompanying drawings. FIG. 1(a) is a schematic explanatory drawing showing the sliding surface of the sliding member according to the first preferred embodiment of the invention. FIG. 1(b) is an enlarged schematic explanatory drawing showing spherical pores in the sliding surface. FIGS. 1(c) and 1(d) are enlarged schematic explanatory drawings showing communicating pores in the sliding surfaces, respectively. FIGS. 2(a) and 2(b) are microphotographs showing the states of pores of a silicon carbide sintered body in the sliding member according to the first preferred embodiment, specifically showing the case where the porosity is 6% and the case where the porosity is 10%, respectively. FIG. 3(a) is a partial sectional view showing a mechanical seal using the mechanical seal ring according to the first preferred embodiment. FIG. 3(b) is a perspective view showing the mechanical seal ring of FIG. 3(a).

As shown in FIG. 1(a), the sliding member of the first preferred embodiment has a sliding surface constructed of a silicon carbide sintered body 1 having a primary phase 2 composed mainly of silicon carbide, and a subphase 3 having a different composition from the primary phase 2 and containing at least boron, silicon and carbon. Pores 4 exist in the sliding surface.

Figure 5:
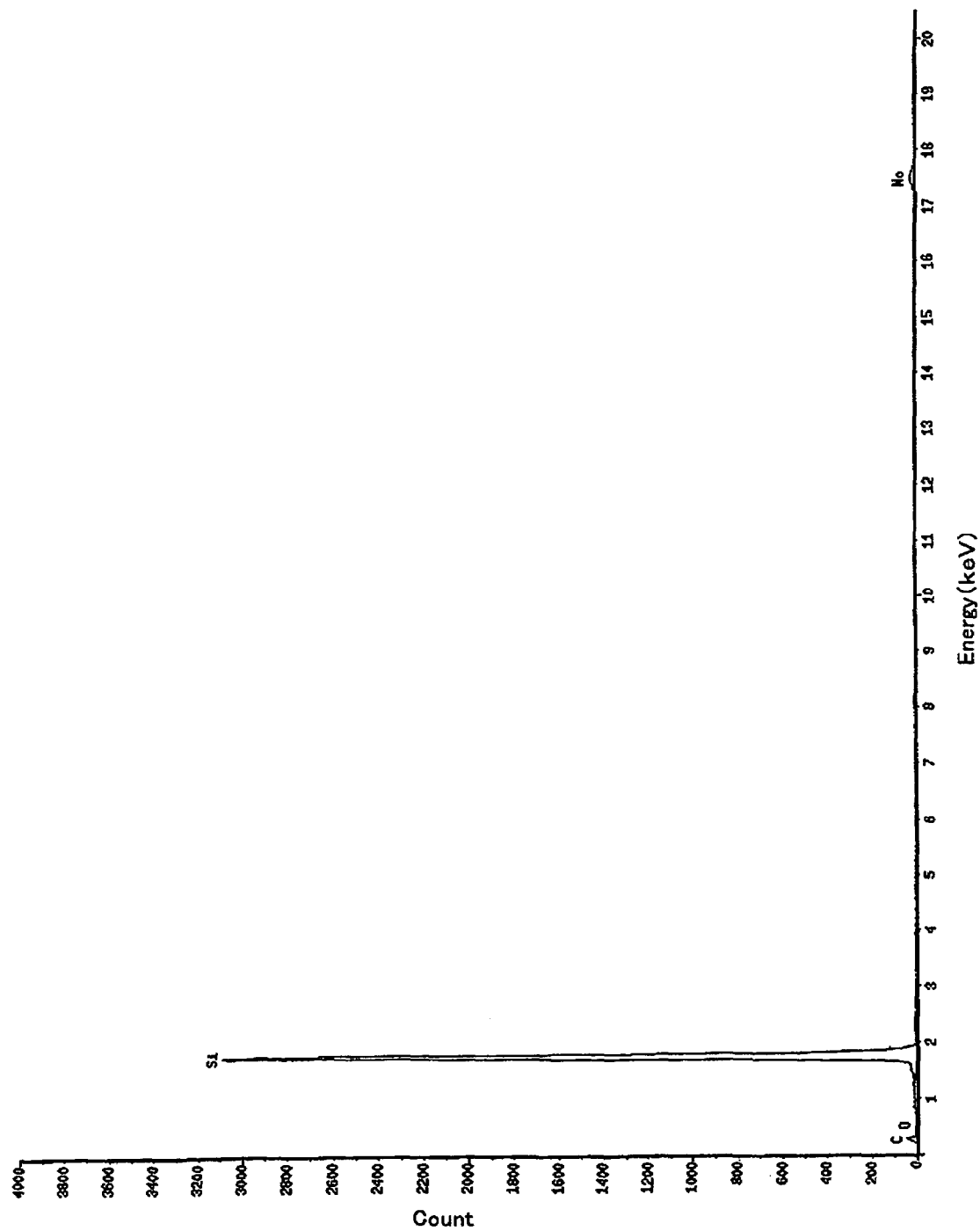
FIG. 5 is a graph showing the EDS measurement result of the primary phase of Sample No. I-1 in Example I.
Figure 6:
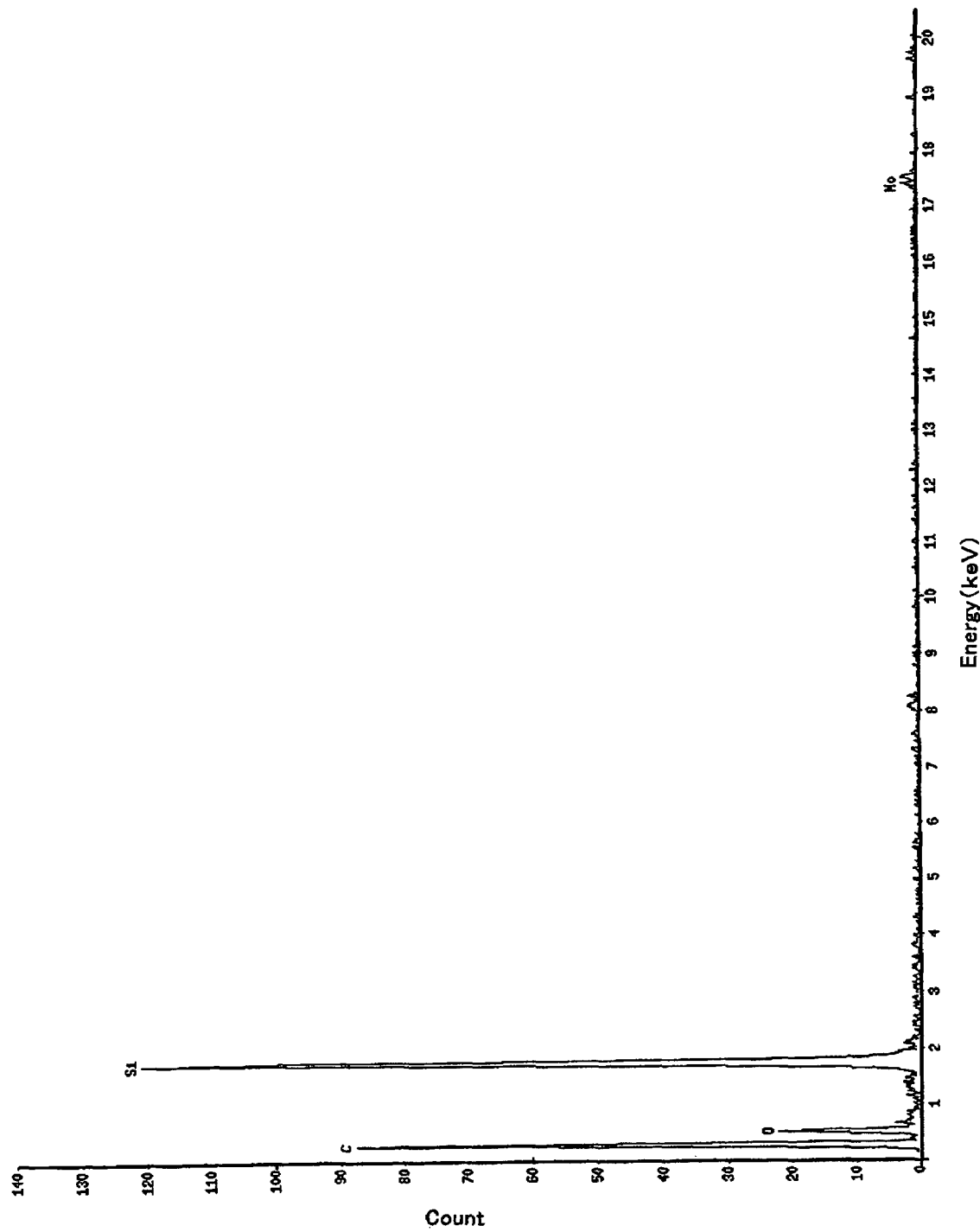
FIG. 6 is a graph showing the EDS measurement result of the subphase of Sample No. I-1 in Example I.
Figure 7:
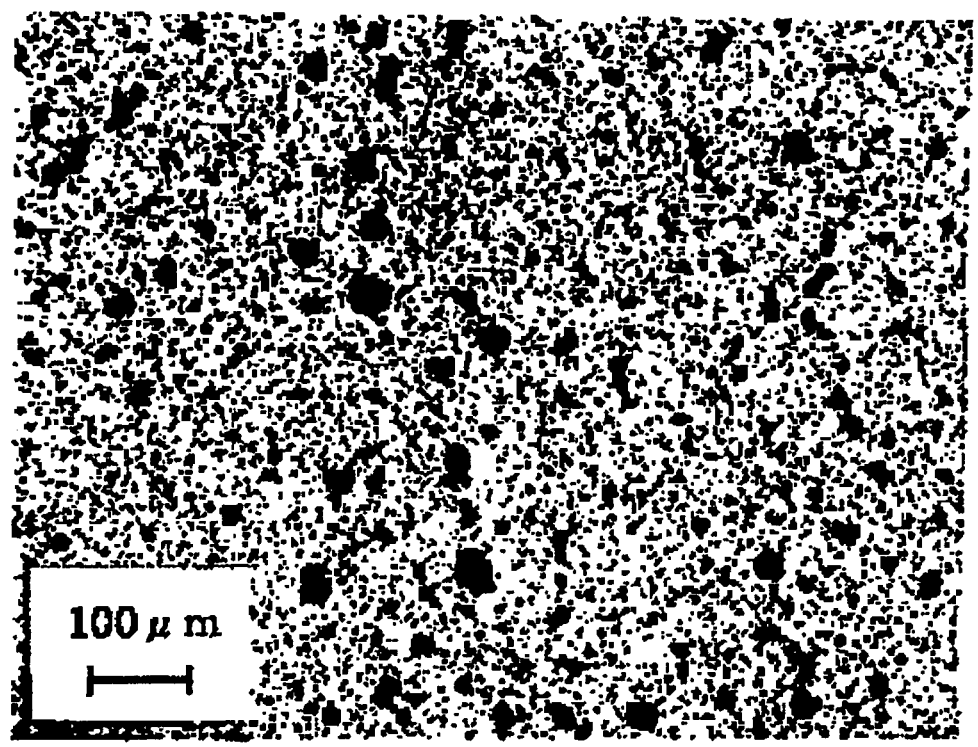
FIG. 7 is a microphotograph showing pores existing in a porous silicon carbide sintered body of related art.

The primary phase 2 means a phase in which the ratio (atomic %) of silicon (Si) and carbon (C), namely Si:C is in the range of 35:65 to 65:35. The subphase 3 means a phase in which the ratio (atomic %) of Si and C, namely Si:C is in the range of 0:100 to 34:66. The ratio (atomic %) of Si and C is determined by the structural observation of the sliding surface by a Transmission Electron Microscope (TEM), followed by an energy dispersive X-ray spectroscopy analysis (EDS). Five locations are measured and the average value thereof is used as the ratio of Si and C. For example, in Sample No. I-1 in Example I described later, the EDS measurement results of the primary phase is Si:C=44:56, as shown in FIG. 5, and the EDS measurement result of the subphase is Si:C=7:93, as shown in FIG. 6.

The above-mentioned primary phase 2 and the subphase 3 can be distinguished by color phases, respectively. That is, the primary phase 2 is a black phase, and the subphase 3 is a color phase exhibiting metallic luster. These color phases can be distinguished by using, for example, the backscattered electron image of the Scanning Electron Microscopy (SEM).

Here, the subphase 3 has a different composition from the primary phase 2 and contains at least boron, silicon and carbon. For example, these elements may exist alone, or silicon (Si) and boron (B) may combine together and exist as silicide and silicon carbide, such as $SiB_4$ and $SiB_6$. The subphase 3 is a granular phase existing only in the region surrounded by a plurality of the primary phases 2. When the subphase 3 is a columnar phase or a needle-shaped phase extending over a plurality of the primary phases 2, the movement of phonons as the carrier of thermal conduction is subject to large restriction. Hereat, the Non-Patent Document 1 discloses neither the sintering temperature nor the sintering time for obtaining a silicon carbide sintered body 40. Depending on the sintering temperature and the sintering time, a subphase 42 in the silicon carbide sintered body 40 has a columnar shape, and the movement of phonons is hindered because the subphase 42 is contained at a high ratio. It is therefore considered that the silicon carbide sintered body 40 has poor thermal conduction and insufficient thermal shock resistance.

In the first preferred embodiment, the subphase 3 is the granular phase dotted among a plurality of the primary phases 2. Hence, the movement of phonons is hardly restricted, thereby improving thermal conductivity and thermal shock resistance. As a result, the heat generation due to friction can be lowered to diminish the wear of the sliding surface.

The granular phase and the columnar or needle-shaped phase can be distinguished by an aspect ratio. Specifically, the aspect ratio of the granular phase is from 1 to below 4, and the aspect ratio of the columnar or needle-shaped phase is 4 or more.

The subphase 3 is preferably smaller than the particle diameter of the primary phases 2 adjacent thereto. This enables reduction in the restriction exerted on the movement of phonons by the subphase 3 having low thermal conductivity, thereby improving thermal conductivity and thermal shock resistance. As a result, the heat generated due to friction can be lowered to diminish the wear of the sliding surface. It can be determined whether or not the subphase 3 is smaller than the particle diameter of the primary phase 2 adjacent thereto, by observing the sliding surface by a Scanning Electron Microscope.

In the silicon carbide sintered body 1, the ratio of the primary phase 2 is suitably 99 to 99.8% by volume, and the ratio of the subphase 3 is suitably 0.2 to 1% by volume. These ratios can be measured by using, for example, fluorescent X-ray analysis method, ICP (inductively coupled plasma) emission analysis method, or carbon analysis method.

The pores 4 include two types of pores, specifically, pores remaining along the grain boundaries without disappearing in the sintering step, namely remaining pores, and pores generated by the burning or thermal decomposition of a pore forming agent due to heating, namely thermally-generated pores. These two types of pores are distinguished by the pore diameters of pores existing in the sliding surface of the sliding member. The remaining pores have a pore diameter of less than 10 μm, and the thermally-generated pores have a pore diameter of 10 μm or more. The pore diameters can be calculated by using equation (2) described later.

The remaining pores have a pore diameter of less than 10 μm, hardly affecting sliding characteristics and seal properties. On the other hand, the thermally-generated pores have a large pore diameter of 10 μm or more, and therefore the shape and the distribution of the thermally-generated pores existing on the sliding surface may greatly affect the sliding characteristics and seal properties of the sliding member.

The thermally-generated pores are classified into spherical pores 4a shown in FIG. 1(b) having a roundness of 6 μm or less and a pore diameter of 10 to 60 μm, and communicating pores 4b shown in FIGS. 1(c) and 1(d) in which a plurality of pores communicate with each other or aggregate together. From the microphotographs showing the pores existing in the sliding surface shown in FIGS. 2(a) and 2(b), it can be seen that the sliding surface of the first preferred embodiment has the spherical pores 4a, the communicating pores 4b and the remaining pores 4c.

The spherical pores 4a are constructed mainly of independent pores independently existing without communicating with other pores. The spherical pores 4a are of a substantially circle when the sliding surface is viewed from above.

In the sliding member of the first preferred embodiment, the ratio of the spherical pores 4a having a roundness of 6 μm or more and a pore diameter of 10 to 60 μm with respect to all pores (the thermally-generated pores) having a pore diameter of 10 μm or more in the sliding surface is 60% or more.

Specifying the ratio of the spherical pores 4a at 60% or more enables retention of high seal properties of the sliding members opposed to each other in the sliding surface, and also enables a high ratio of the spherical pores 4a contributing to improvement of sliding characteristics, thus achieving high sliding characteristics.

The roundness of the spherical pores 4a adjusted to 6 μm or less aims at retaining high seal properties in the sliding surface. That is, the roundness of 6 μm or less prevents the lubricating liquid from leaking more than necessary, and makes it difficult to degranulate, thus permitting high seal properties. The roundness can be calculated by using equation (1) described later.

The pore diameter adjusted to 10 to 60 μm aims at achieving compatibility of sliding characteristics and seal properties in the sliding surface. Especially, the ratio of the spherical pores 4a is more preferably 75% or more, thereby further enhancing the seal properties in the sliding surfaces. Although it is most effective to adjust the ratio of the spherical pores 4a to 100% in order to improve seal properties and sliding characteristics, it is preferable to adjust the ratio thereof to 90% or less in terms of manufacturing costs and production efficiency.

On the other hand, a high ratio of the pores having a roundness exceeding 6 μm and the pores having a pore diameter exceeding 60 μm may deteriorate seal properties. A high ratio of the pores having a pore diameter of less than 10 μm increases the pores not contributing to the improvement of sliding characteristics, resulting in poor sliding characteristics.

The roundness is defined by the following equation (1).

[Equation 1]

$$\text{Roundness}=(\text{Maximum value of pore diameter}(a)-\text{Minimum value of pore diameter}(b))\times 1/2 \quad (1)$$

The pore diameter (φ) is defined by the following equation (2).

[Equation 2]

$$\text{Pore diameter}(\phi)=(\text{Maximum value of pore diameter}(a)+\text{Minimum value of pore diameter}(b))\times 1/2 \quad (2)$$

From the above equation (1), the roundness of a pore becomes smaller as it becomes closer to a perfect circle, and the roundness is zero when it becomes the perfect circle. A larger difference between the maximum diameter and the minimum diameter of the pore produces a larger value. The roundness expressed by equation (1), the pore diameter (φ) expressed by equation (2), and the ratio of the spherical pores 4a can be measured by observing by an industrial microscope a surface that is obtained by polishing the surface to be the sliding surface of the sliding member by using diamond abrasive grains having a mean particle diameter of 3 μm.

More specifically, they can be measured by the industrial microscope set at 100 times magnification, and extracting and analyzing five locations in the sliding surface, each location having a measuring area of 1235 μm×926 μm. The maximum value of a pore corresponds to the diameter of the minimum circumscribed circle surrounding the pore, and the minimum value of the pore corresponds to the diameter of the maximum inscribed circle surrounded by the pore. Accordingly, as shown in FIG. 1(b), the maximum value (a) of the pore diameter is a diameter "a" of a minimum circumscribed circle C1 surrounding the pore (the spherical pore 4a), and the minimum value (b) of the pore diameter is a diameter "b" of a maximum inscribed circle C2 surrounded by the pore (the spherical pore 4a).

At the 100 times magnification, at least one point of inflection 4d is observed in the contour forming the communicating pore 4b, and no point of inflection is observed in the contour forming the spherical pore 4a.

In the sliding member of the first preferred embodiment, the dispersibility of the spherical pores 4a in the sliding surface also affects seal properties. Higher dispersibility of the spherical pore 4a produces higher seal properties. Lower dispersibility, namely higher agglutinability produces lower seal properties. In the first preferred embodiment, the dispersion density of the spherical pores 4a in the sliding surface is preferably 60 pieces/mm² or more. This enables a properly dispersed state with little aggregation of pores on the sliding surface, thereby further improving seal properties. That is, the dispersed state of the spherical pores 4a on the sliding surface is brought into the dispersed state capable of retaining high seal properties. Particularly, the dispersion density is more preferably 95 pieces/mm² or more. In the same manner as when measuring the ratio of the spherical pores 4a in the sliding surface, the dispersion density can be measured by extracting five locations in the sliding surface, each location having a measuring area of 1235 μmm×926 μm, and analyzing them at 100 times magnification by the industrial microscope.

When the sliding surface is viewed from above, the spherical pores 4a have such a shape that the contour portions forming the spaces of the pores are preferably continuous curves.

The sliding member of the first preferred embodiment has different seal properties depending on the maximum diameter of the pores in the sliding surface. For example, in the spherical pore 4a as shown in FIG. 1(b), the maximum diameter of the pore corresponds to the maximum value "a" of the pore diameter. In the communicating pore 4b as shown in FIG. 1(c), the maximum diameter is L1. In the aggregated communicating pore 4b as shown in FIG. 1(d), the maximum diameter is L2. The minimum value of the pore in the communicating pore 4b as shown in FIG. 1(c) is L3. The minimum value of the pore in the communicating pore 4b as shown in FIG. 1(d) is L4.

The maximum diameters of these pores are preferably 100 µm or less. This avoids the presence of communicating pores having such an extreme shape as to deteriorate seal properties and high agglutinability, and spherical pores having an extremely large diameter, thus further enhancing seal properties.

The maximum pore diameter can also be measured by extracting five locations in the sliding surface, each location having a measuring area of 1235 µm×926 µm, and analyzing them at 100 times magnification by the industrial microscope.

In the sliding member of the first preferred embodiments the porosity of the silicon carbide sintered body 1 constituting the sliding surface is preferably 2.5% to 12%. This imparts high lubricating liquid holding performance, so that sliding characteristics can be improved to facilitate retention of mechanical characteristics.

That is, the porosity of the silicon carbide sintered body 1 also affects mechanical characteristics in addition to the seal properties of the sliding member and sliding characteristics. A high porosity improves sliding characteristics, whereas seal properties and mechanical characteristics are deteriorated. On the other hand, a low porosity improves the seal properties and the mechanical characteristics of the sliding member, whereas sliding characteristics are deteriorated. The porosity adjusted to 2.5% to 12% decreases the ratio that the pores existing on the sliding surface communicate with the pores existing on the surfaces other than the sliding surface. This prevents that the lubricating liquid supplied to the sliding surface leaks outside through the communicating pores. Hence, it is easy for the lubricating liquid held within the pores to form a continuous fluid film on the sliding surface, thereby achieving high sliding characteristics and high seal properties required for mechanical seal rings or the like.

In particular, the porosity is more preferably 3% to 8%. The porosity of the silicon carbide sintered body 1 can be measured according to Archimedean method.

A method of manufacturing the sliding member according to the first preferred embodiment will be described below.

The steps of obtaining the sliding member include the blending step, the molding step and the sintering step. These steps are described sequentially.

In the blending step, slurry (a raw material) is obtained by adding and mixing boron carbide powder, a sintering additive such as phenol resin, a pore forming agent, a pore dispersing agent for dispersing the pore forming agent, and water, etc. into silicon carbide powder as a main ingredient.

As the pore forming agent, suspension-polymerized non-crosslinked resin beads formed from at least one of silicone beads, polystyrene, phenol resin and acryl-styrene copolymer may be used. The compression strengths of these resin beads are as low as 1.2 MPa or less, and they are therefore easily plastically deformed in the pressure direction during the molding step, thereby diminishing micro cracks that are liable to occur as elastic recovery proceeds. The pore forming agent is thermally decomposed or eliminated to form pores (thermally-generated pores) capable of supplying the lubricant onto the sliding surface.

Here, the first preferred embodiment employs the pore dispersion agent. That is, in order to obtain the spherical pores 4a having a roundness of 6 µm or less and a pore diameter of 10 to 60 µm with respect to all pores having a pore diameter of 10 µm or more in the sliding surface of the obtained sliding member, it is suitable to use as the pore forming agent which has a roundness of 4 µm or less and a diameter of 12 to 75 µm. However, the pore forming agent is a hydrophobic material and hence cannot be dispersed in the slurry with water added thereto, thus being susceptible to aggregation. There is a high possibility that the formed pores are connected to each other on the sliding surface. Depending on the case, seal properties may be deteriorated. It is therefore necessary to disperse the pore forming agent, and add the pore dispersing agent that functions to disperse the pore forming agent. The added pore dispersing agent adsorbs the pore forming agent, so that the pore forming agent easily wets and permeates, and the reaggregation of the pore forming agent is reduced, thereby enabling the pore forming agent to disperse without aggregating into the slurry. In this case, 0.1% by mass or more of the pore dispersing agent may be added to 100% by mass of the pore forming agent. Consequently, irrespective of the type of the pore forming agent, the pore forming agent can be sufficiently and easily dispersed to improve manufacturing efficiency.

Preferable examples of the pore dispersing agent include anionic interface activating agents such as carboxylate, e.g., polycarboxylic acid sodium, sulfonate, sulfate ester and phosphate ester. The anionic interface activating agent is highly effective in allowing the pore forming agent to wet and permeate into the slurry. The anionic interface activating agent adsorbing the pore forming agent enables the pore forming agent to easily wet and permeate into the slurry. The reaggregation of the pore forming agent can be further reduced by the charge repulsion of hydrophilic groups contained in the anionic interface activating agent. It is therefore easy to sufficiently disperse the pore forming agent in the slurry without aggregation. Although when manufacturing the slurry by mixing the silicon carbide powder as a main ingredient with water, the silicon carbide slurry is alkalized to reduce the aggregation of the silicon carbide powder, the aggregation of the silicon carbide powder and the pore forming agent can also be reduced even in the alkaline slurry by using the anionic interface activating agent. Thus, the dispersion of the pore forming agent in the slurry increases the ratio that the pores in the sliding surface of the obtained sliding member exist as the independent spherical pores 4a, and diminishes extremely large pores that deteriorate seal properties, thereby enabling the long-term retention of seal properties.

In the molding step, granules are obtained by adding and mixing a molding binder into the obtained slurry, followed by spray drying. Then, a molding raw material with some of the granules encased in the pore forming agent is obtained.

The content of the pore dispersing agent may be increased to increase the dispersion density of the spherical pores 4a in the sliding surface of the obtained sliding member. For example, in order to attain the dispersion density of 60 pieces/mm$^2$ or more, 1% by mass or more of the dispersing agent may be added to 100% by mass of the pore forming agent.

Similarly, in order to attain the pore maximum diameter of 100 µm or less in the sliding surface of the obtained sliding member, the content of the pore dispersing agent may be increased, and the pore forming agent having a small diameter may be used. As a specific example, 1% by mass or more of the dispersing agent may be added, and the pore forming agent having a diameter of 40 µm or less may be used with respect to 100% by mass of the pore forming agent.

The porosity of the silicon carbide sintered body 1 constituting the sliding member may be adjusted by, for example, the ratio of the pore forming agent. As specific examples, the porosity of 2.5% or more is attained by adjusting the ratio of the pore forming agent to 1% by mass or more, and the porosity of 12% or less is attained by adjusting the ratio of the pore forming agent to 5% by mass or less with respect to 100% by mass of the mixed powder of silicon carbide and boron carbide, respectively.

The granules of the molding raw material are charged into a predetermined mold and molded at a molding pressure suitably selected from the range of 49 to 147 MPa, thereby obtaining a molded body.

In the sintering step, the molded body is defatted in nitrogen atmosphere at a temperature of 450° C. to 650° C. for a hold time of 2 to 10 hours, resulting in a defatted body. The defatted body is then put in a sintering furnace and held in reduced pressure atmosphere of an inert gas at a temperature of 1800° C. to 2100° C. for a hold time of 3 to 5 hours to sinter, resulting in a silicon carbide sintered body 1. Through the blending step, the molding step and the sintering step, the pore forming agent is uniformly dispersed to diminish the extremely large pores that deteriorate seal properties, and also decrease the communicating pores, thus facilitating a long-term retention of seal properties. Although no special limit is imposed on the inert gas, argon gas is suitably used because it is easy to purchase and handle.

The pressed surface of the obtained sintered body may be subjected to grinding, polishing or the like when necessary. For example, the sliding surface may be obtained by flattening the pressed surface with a double-head grinding machine or a surface grinding machine, and roughly machining it with a lapping machine made of alumina by using diamond abrasive grains having a mean particle diameter of 3 μm, and then mirror-finishing it with a lapping machine made of tin by using diamond abrasive grains having a mean particle diameter of 1 μm so that the arithmetic mean height Ra is 0.98 μm or less. The arithmetic mean height Ra of 0.98 μm or less facilitates retention of seal properties.

The arithmetic mean height Ra may be measured according to JIS B 0601-2001 (corresponding to ISO 4287:1997). That is, when the measuring length and the cut-off value are set at 5 mm and 0.8 mm, respectively, and the measurement is carried out by using a contact surface roughness tester, a stylus having a tip end radius of 2 μm may be applied to the sliding surface of the sliding member, and the scanning rate of the stylus may be set at 0.5 mm/sec.

The surface of the sintered body is thus polished to provide a mechanical seal ring. According to the above manufacturing method, it is inexpensive to obtain the sliding member such as the mechanical seal ring having excellent lubricating liquid retention performance and excellent thermal conductivity and thermal shock resistance.

The mechanical seal ring and the mechanical seal, each using the sliding member according to the above-mentioned first preferred embodiment will be described below.

As shown in FIG. 3(a), the mechanical seal is a device using a mechanical seal ring 5 that exerts sealing action by sliding a sliding surface 15b of the rotary ring 5b as an annular body having a convex portion, on a sliding surface 15a of the stationary ring 5a as an annular body. The mechanical seal ring 5 is mounted between a rotary shaft 6 transmitting the driving force supplied from a driving mechanism (not shown) and a casing 7 rotatably supporting the rotary shaft 6, so that the sliding surfaces 15a and 15b of the stationary ring 5a and the rotary ring 5b form vertical surfaces to the rotary shaft 6, respectively.

The mechanical seal ring 5 consists of the stationary ring 5a and the rotary ring 5b for bringing the sliding surfaces 15a and 15b into contact and slide through a lubricating liquid, respectively. At least one of the stationary ring 5a and the rotary ring 5b is formed from the sliding member of the first preferred embodiment. The sliding member has excellent seal properties and lubricating liquid retention performance as described above. Consequently, the mechanical seal ring 5 and the mechanical seal each using the sliding member have high long-term reliability.

The rotary ring 5b is cushioningly supported by a packing 8. A coil spring 9 is mounted so as to wind around the rotary shaft 6 on the side opposed to the rotary ring 5b of the packing 8. By pressing the packing 8 with the springback force of the coil spring 9 (the preset force of the coil spring 9), the sliding surface 15b of the rotary ring 5b is pressed so as to cause sliding by the sliding surface 15a of the stationary ring 5a. A collar 10 is fixed by a set screw 11 to the rotary shaft 6 and mounted as the stopper of the coil spring 9 on the opposite side from that the coil spring 9 presses the packing 8.

The stationary ring 5a contacting the sliding surface 15b of the rotary ring 5b through the sliding surface 15a is supported by a cushion rubber 12. The cushion rubber 12 is mounted inside a casing 7, serving as the outer frame of the mechanical seal, so as to support the stationary ring 5a. When the rotary shaft 6 is rotated, the collar 10 is also rotated. Then, the packing 8 pressed by the springback force of the coil spring 9, and the sliding surface 15b of the rotary ring 5b supported by the packing 8 are rotated while being pressed, thereby exerting the sealing action with the sliding surface 15a of the stationary ring 5a. When the mechanical seal is mounted on a fluid equipment (not shown), the mechanical seal is mounted so that the fluid equipment is arranged on the extension of the collar 10 with respect to the mechanical seal ring 5.

At this time, the fluid enters into the inside surrounded by the casing 7 of the mechanical seal. However, the sealing action of an o-ring 13 mounted between the packing 8 and the rotary shaft 6, and the sealing action of the sliding surfaces 15a and 15b of the mechanical seal ring 5 cooperate to eliminate the fluid leakage from the mechanical seal to the outside. The fluid sealed by the mechanical seal at this time is called a sealed fluid 14, part of which enters into between the sliding surfaces 15a and 15b of the mechanical seal ring 5 and acts as a lubricating liquid. On the other hand, the rotary ring 5b is cushioningly supported by the packing 8, and the cushion rubber 12 and the packing 8 also function to absorb vibrations generated by the rotation of the rotary shaft 6.

When the rotary ring 5b starts to slide, the dynamic pressure due to air flow is firstly generated on the sliding surfaces 15a and 15b. Subsequently, on the spherical pores 4a, negative pressure lower than the dynamic pressure is applied to the lubricating liquid retained within the spherical pores 4a. The negative pressure generated on the spherical pores 4a enables the lubricating liquid retained within the spherical pores 4a to be suitably supplied to the sliding surfaces 15a and 15b, thereby providing the mechanical seal ring 5 having high strength and high sliding characteristics.

In the mechanical seal shown in FIG. 3(a), the stationary ring 5a is the annular body, and the rotary ring 5b is the annular body having the convex portion. Conversely, the stationary ring 5a may be the annular body having the convex portion, and the rotary ring 5b may be the annular body.

A second preferred embodiment of the invention will next be described in detail with reference to the accompanying drawings. FIG. 4(a) is a schematic explanatory drawing showing the crystal structure of a silicon carbide sintered body in a sliding member according to the second preferred embodiment. FIG. 4(b) is an enlarged schematic explanatory drawing showing the subphase of FIG. 4(a).

As shown in FIG. 4(a), the sliding member of the second preferred embodiment has a sliding surface formed from a silicon carbide sintered body 16 having a primary phase 17 composed mainly of silicon carbide, and a subphase 18 containing at least boron, silicon and carbon. The subphase 18 is a granular crystal phase dotted independently among a plurality of the primary phases 17.

That is, the subphase 18 of the second preferred embodiment is the granular phase existing only in the regions surrounded by the plurality of the primary phases 17. When the subphase 18 is a columnar phase or a needle-shaped phase extending over a plurality of the primary phases 17, the movement of phonons as the carrier of thermal conduction is subject to large restriction. In the second preferred embodiment, the subphase 18 is the granular phase dotted among a plurality of the primary phases 17, the movement of phonons is hardly restricted, so that both thermal conductivity and thermal shock resistance can be improved. As a result, the heat generation due to friction can be lowered to diminish the wear of the sliding surface.

Particularly, a distance "d" between the adjacent subphases 18 is preferably 3 μm or more. Thereby, the movement of phonons is further unsusceptible to restriction.

The state in which the subphase 18 is dotted among a plurality of the primary phases 17, and the distance "d" can be confirmed by observing the cross section of the silicon carbide sintered body 16 or the sliding surface by a Transmission Electron Microscope or a scanning electron microscope set at 3000 to 10000 times magnification.

In addition to boron, silicon and carbon, unavoidable impurities such as sodium (Na), magnesium (Mg), iron (Fe), aluminum (Al) and calcium (Ca) may be contained in the subphases 18, which will cause no problem. From the viewpoint of maintaining mechanical characteristics, the total amount of these unavoidable impurities is preferably 0.1% by volume or less with respect to the silicon carbide sintered body 16.

Figure 4:
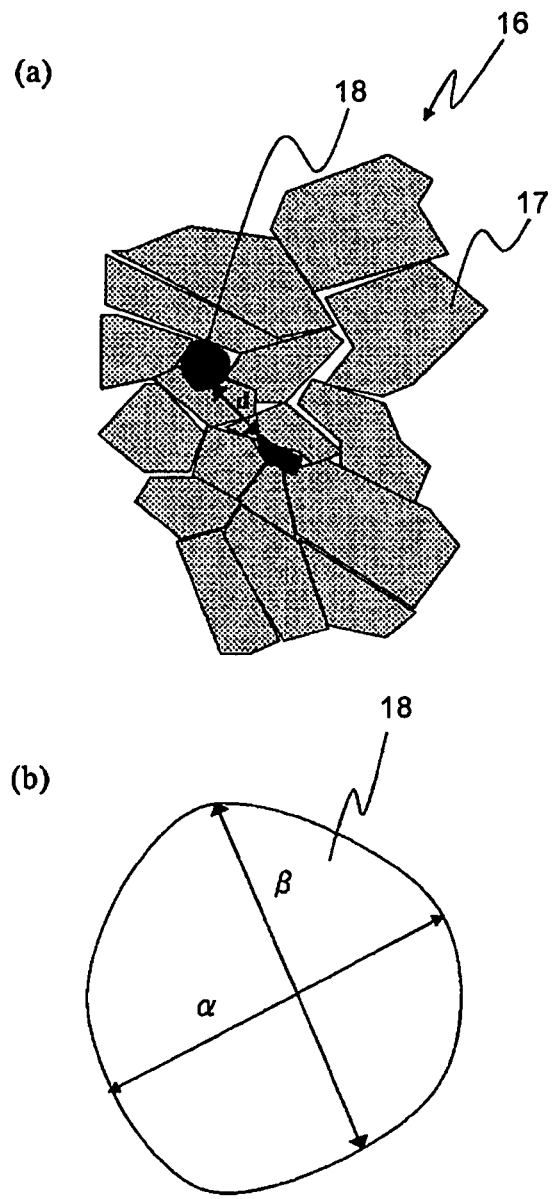
FIG. 4(a) is a schematic explanatory drawing showing the crystal structure of a silicon carbide sintered body in a sliding member according to a second preferred embodiment of the invention.
FIG. 4(b) is an enlarged schematic explanatory drawing showing the subphase in FIG. 4(a)

The thermal conductivity and thermal shock resistance of the sliding member is susceptible to the influence of the shape of the subphase 18, namely the aspect ratio thereof. As shown in FIG. 4(*b*), the aspect ratio of the subphase 18 is the ratio of a long axis β to a short axis α (namely, the long axis β/the short axis α). The movement of phonons is more unsusceptible to restriction as the ratio becomes smaller, thereby improving the thermal conductivity and thermal shock resistance of the sliding member.

In the second preferred embodiment, the aspect ratio of the subphase 18 is preferably 2.5 or less (excluding 0). Thereby, the movement of phonons is more unsusceptible to restriction, enabling further improvement in both the thermal conductivity and thermal shock resistance of the sliding member. As a result, the heat generation due to friction can be lowered, and the wear of the sliding surface can be further diminished.

The aspect ratio of the subphase 18 can be measured from the image of the cross section of the silicon carbide sintered body 16 or the sliding surface by a Transmission Electron Microscope or a scanning electron microscope set at 3000 to 10000 times magnification.

As described above, the subphase 18 contains at least boron, silicon and carbon. As described later, in the method of manufacturing the silicon carbide sintered body constituting the sliding member of the invention, silicon and carbon in the subphase are obtained by molding and sintering the raw material powder prepared by mixing boron carbide powder and the like into silicon carbide powder. Therefore, the silicon and the carbon within the silicon carbide sintered body are contained as the subphase in the silicon carbide sintered body. Especially, the boron contained in the subphase 18 performs an important action in the second preferred embodiment and affects on the mechanical characteristics and thermal conductivity of the sliding member. When the content of boron is too low, the crystal particles of silicon carbide cannot be sufficiently bonded together, thus deteriorating mechanical characteristics and thermal conductivity. On the other hand, when the content of boron is too high, a subphase having a high aspect ratio is deposited and the movement of phonons is susceptible to restriction, thereby deteriorating thermal conductivity. In the sliding member of the second preferred embodiment, the content of boron is preferably 0.2 to 0.3% by mass with respect to 100% by mass of the silicon carbide sintered body. By adjusting the content of boron to the above-mentioned range, the boron acts as sintering additive, resulting in the sliding member having both high mechanical characteristics and high thermal conductivity.

The content of boron can be measured by using fluorescent X-ray analysis method or ICP emission analysis method. Most of the boron form the subphase 18 together with silicon and carbon, and some boron may be dispersed into the crystal particles of silicon carbide.

Also in the second preferred embodiment, the porosity of the silicon carbide sintered body 16 is preferably 2.5% to 12%, more preferably 3% to 8%, for the same reason as described in the first preferred embodiment.

A method of manufacturing the sliding member according to the second preferred embodiment will be described below.

Firstly, slurry is obtained by adding water, a dispersing agent, boron carbide powder, a sintering additive such as and phenol resin, a pore forming agent, a pore dispersing agent into silicon carbide powder, and then mixing and grinding with a ball mill (the blending step). Silicon carbide granules are obtained by adding and mixing binder into the slurry, followed by spray drying. These granules are then molded to obtain a molded body (the molding step).

The content of boron with respect to the silicon carbide sintered body 16 is subjected to the influence of the added boron carbide powder. In order to adjust the content of boron to 0.2 to 0.3% by mass with respect to 100% by mass of the silicon carbide sintered body, the content of boron carbide powder may be adjusted to 1 to 3% by mass with respect to the silicon carbide powder.

In order to adjust the porosity of the silicon carbide sintered body 16 to 2.5% to 12%, 0.5 to 10% by mass of resin beads, which are previously ground as a pore forming agent to be burned out or thermally decomposed in the defatting step or the sintering step, is added to the granules and mixed together to prepare a mixed raw material. The mixed raw material is then charged into a mold and pressed and molded, resulting in a molded body having a predetermined shape. Examples of the above-mentioned resin beads include the same one as described in the first preferred embodiment.

When necessary, the temperature of the obtained molded body may be raised for 10 to 40 hours in nitrogen atmosphere, and maintained at 450° C. to 650° C. for 2 to 10 hours, then spontaneously cooled and defatted. For example, the silicon carbide sintered body 16 is obtained by holding the obtained defatted molded body in reduced pressure atmosphere of an inert gas at a temperature of 1800° C. to 2100° C. for 3 to 5 hours to sinter (the sintering step).

The aspect ratio of the subphase 18 is especially susceptible to the influence of the sintering temperature. Increasing the sintering temperature leads to a large aspect ratio value, and decreasing the sintering temperature leads to a small aspect ratio value. In order to adjust the aspect ratio of the subphase 18 to 2.5 or less (excluding 0), the sintering temperature may be adjusted to 1800° C. to 2000° C.

The distance "d" between the adjacent subphases 18 is susceptible to the influence of the sintering time. Increasing the sintering time leads to a large distance value, and decreasing the sintering time leads to a small distance value. In order to adjust the distance "d" between the adjacent subphases 18 to 3 µm or more, the sintering time may be in the range of 4.5 to 5 hours.

According to the above manufacturing method, it is inexpensive to attain the sliding member such as the mechanical seal ring having excellent lubricating liquid retention performance as well as excellent thermal conductivity and excellent thermal shock resistance.

The mechanical seal ring and the mechanical seal, each using the sliding member according to the second preferred embodiment will be described below. In the mechanical seal ring and the mechanical seal according to the second preferred embodiment, at least one of the stationary ring 5a and the rotary ring 5b is formed from the sliding member according to the second preferred embodiment (refer to FIG. 3).

The sliding member has excellent thermal conductivity and excellent thermal shock resistance. Therefore, the mechanical seal ring and the mechanical seal according to the second preferred embodiment can be suitably used under severe use conditions in which at the start of sliding, high friction heat is momentarily generated, thus being susceptible to thermal shock.

Otherwise, the configuration is identical to that of the first preferred embodiment, and therefore the description thereof is omitted here.

While the preferred embodiments of the present invention have been described and illustrated above, it is to be understood that they are exemplary of the invention and are not to be considered to be limiting. Changes and modifications can be made thereto without departing from the gist of the present invention. For example, the invention is not limited to the sliding members according to the first and second preferred embodiments, respectively. For example, the invention may be a sliding member according to other preferred embodiment as a combination of the sliding member of the first preferred embodiment and the sliding member of the second preferred embodiment.

The pore shape in the invention may be a columnar shape instead of the spherical pores 4a, as long as the roundness is 6 m or less and the pore diameter is 10 to 60 µm in the sliding surfaces.

The invention will be described below in detail based on examples. However, it is to be understood that the invention is not limited to the following examples.

Example I

<Sample Preparation>

A predetermined amount of boron carbide powder was added to silicon carbide powder as a main ingredient, and suspension-polymerized non-crosslinked resin beads composed of phenol resin and polystyrene having the maximum diameter shown in Table 1 was added thereto as a pore forming agent. The pore forming agent having a roundness of 4 µm or less and a diameter of 12 to 75 µm was used in each sample. The pore forming agent was added at the ratio shown in Table 1, with respect to 100% by mass of the mixed powder of silicon carbide and boron carbide. Further, as a pore dispersing agent, polycarboxylic acid sodium was added and mixed at the ratio shown in Table 1, with respect to 100% by mass of the pore forming agent, thereby obtaining a raw material.

The obtained raw material was put into a ball mill and mixed for 48 hours to make slurry. As a molding additive, binder was added and mixed to the slurry, followed by spray drying, thereby obtaining a molding raw material composed of silicon carbide granules having a mean particle diameter of 80 µm.

The molding raw material was then charged into a mold and pressed and molded at a pressure of 98 MPa in the thickness direction, thereby obtaining a ring-shaped molded body. The temperature of the obtained molded body was raised for 20 hours in nitrogen atmosphere, and held at 600° C. for 5 hours, then spontaneously cooled and defatted, thereby obtaining a defatted body.

Finally, the defatted body was held at about 2000° C. for 4 hours and then sintered to manufacture a silicon carbide sintered body having a primary phase of silicon carbide, and a subphase containing boron, silicon and carbon.

Figure 3:
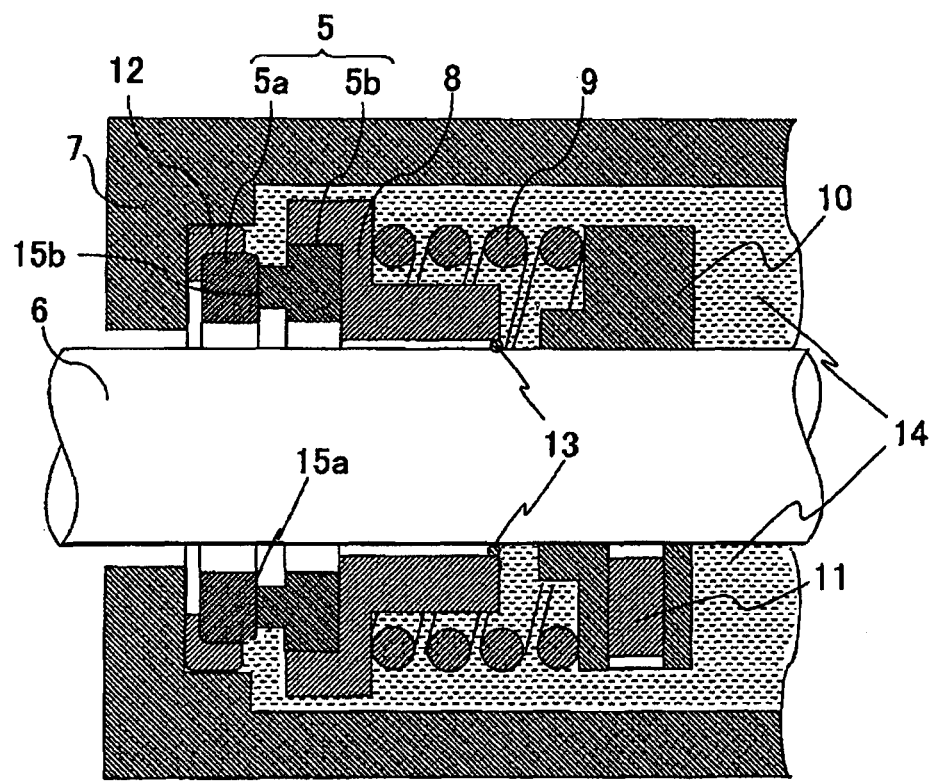
FIG. 3(a) is a partial sectional view showing a mechanical seal using a mechanical seal ring according to the first preferred embodiment of the invention.
FIG. 3(b) is a perspective view showing the mechanical seal ring of FIG. 3(a)
Figure 3:
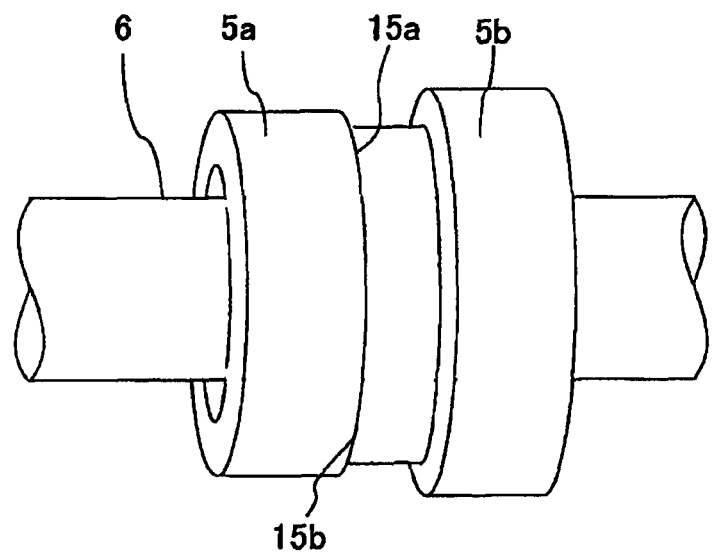

The surface of each of the obtained silicon carbide sintered bodies was ground by a surface grinding machine, and roughly machined by a lapping machine made of alumina using diamond abrasive grains having a mean particle diameter of 3 µm. Subsequently, the surface thereof was polished by a lapping machine made of tin using the diamond abrasive grains having a mean particle diameter of 3 µm, so as to have an arithmetic mean height (Ra) of 0.98 µm or less, thereby obtaining a sliding surface. Thus, Sample Nos. I-1 to I-18 were manufactured which were mechanical seal rings having an outer diameter of 26 mm and an inner diameter of 19 mm. These samples were the stationary rings 5a as shown in FIG. 3.

Setting an industrial microscope at 100 times magnification, five locations, each location having a measuring area of 1235 µm×926 µm in the sliding surface of each sample thus obtained, were extracted and analyzed to measure the ratio of spherical pores having a roundness of 6 µm or less and a pore diameter of 10 to 60 µm, the dispersion density of these spherical pores, and the maximum diameter of the pores in the individual sliding surface. At this time, the area ratios of the primary phase and the subphase were also measured. As a result, the primary phase accounted for 95% by area, and the subphase accounted for 5% by area with respect to 100% by mass of the total area of the primary phase and the subphase.

When measuring the ratio (atomic %) of Si and C in the primary phase and that of the subphase, the structural observation on the sliding surface was carried out by a TEM, followed by measurement by an Energy Dispersive X-ray Spectroscopy Analysis (EDS). Specifically, five locations were measured, and the average value thereof was used as the ratio of Si and C. It was evaluated whether the ratio of Si and C, Si:C, in the primary phase was within the range of 35:65 to 65:35, and the ratio of Si and C, Si:C, in the subphase was within the range of 0:100 to 34:66. As an example of the measurement results by the Energy Dispersive X-ray Spectroscopy Analysis (EDS), the measurement result of the primary phase in Sample No. I-1 is shown in FIG. 5, and the measurement result of the subphase is shown in FIG. 6. The primary phase in Sample No. I-1 had the result of Si:C=44:56, and the subphase had the result of Si:C=7:93.

The porosity of the silicon carbide sintered body constituting each sample was measured according to Archimedean method.

<Characteristic Evaluation>

There was prepared a rotary ring 5b composed of carbon which was an annular body having an outer diameter of 26 mm and an inner diameter of 19 mm, and had a convex portion having an outer diameter of 24 mm and an inner diameter of 21 mm. The rotary ring 5b and each of the stationary rings 5a (Sample Nos. I-1 to I-18) were brought into contact with sliding surfaces 15a and 15b through a rotary shaft 6, and then slid under the following sliding conditions to measure the leak amount from the sliding surfaces 15a and 15b, indicating seal properties, and measure the coefficient of friction indicating sliding characteristics.

<Sliding Conditions>
  Relative speed: 8 m/s
  Surface pressure: 500 kPa
  Lubricating liquid: water
  Sliding time: 100 hours The relative speed is the rotation speed of the rotary ring 5b with respect to the stationary ring 5a at a position facing to the outer periphery with reference to the center of the rotary shaft, and being spaced therefrom by 11.25 mm (hereinafter referred to as position P). The surface pressure is the pressure per unit area of the rotary ring 5b with respect to the stationary ring 5a, and is found by dividing a pressurizing force F preset for bringing the stationary ring 5a and the rotary ring 5b into contact with each other, by the area of the sliding surface 15b of the rotary ring 5b. Setting a metal microscope provided with a gauge at 50 times magnification, the area was calculated by measuring with the gauge the outer diameter and the inner diameter of the convex portion of the rotary ring 5b.

With regard to the coefficient of friction "$\mu$", the rotation torque T at the position P of the rotary ring 5b during sliding was measured by using a torque meter. The pressuring force F was obtained by multiplying the area of the sliding surface 15b by a surface pressure. Then, the coefficient of friction "$\mu$" was obtained by dividing the rotation torque T by the pressuring force F and the distance 11.25 mm from the center of the rotary shaft to the position P. That is, the coefficient of friction "$\mu$" was a value calculated from the following equation: $\mu = T/11.25\,F$. The obtained values are shown in Table 1.

With regard to four-point bending strength indicating mechanical characteristics, samples made of flexural test pieces were prepared separately, and measured according to JIS R 1601-1995 (corresponding to ISO 14704: 2000 or ICS 81.060.30). The measured values are shown in Table 1.

In Table 1, the ratio of spherical pores having a roundness of 6 $\mu$m or less and a pore diameter of 10 to 60 $\mu$m to all pores having a pore diameter of 10 $\mu$m or more in the sliding surfaces, and the dispersion density of the spherical pores are represented as merely the ratio of the spherical pores and the dispersion density of the spherical pores for simplicity.

TABLE 1

| Sample No. | Pore forming agent Maximum diameter ($\mu$m) | Pore forming agent Ratio (% by mass) | Pore dispersing agent Added ratio with respect to pore forming agent (% by mass) | Ratio of spherical pore (%) | Dispersion density of spherical pores (mm$^2$/piece) | Maximum diameter of pores ($\mu$m) | Porosity (%) |
|---|---|---|---|---|---|---|---|
| *I-1 | 30 | 2.5 | 0.03 | 30 | 68 | 72 | 6 |
| *I-2 | 31 | 2.5 | 0.05 | 40 | 67 | 75 | 6 |
| *I-3 | 30 | 2.5 | 0.07 | 50 | 66 | 73 | 6 |
| I-4 | 30 | 2.5 | 0.22 | 60 | 71 | 71 | 6 |
| I-5 | 28 | 2.5 | 0.24 | 60 | 75 | 71 | 6 |
| I-6 | 27 | 2.5 | 0.1 | 65 | 75 | 71 | 6 |
| I-7 | 32 | 2.5 | 0.1 | 75 | 53 | 77 | 6 |
| I-8 | 31 | 2.5 | 0.15 | 75 | 60 | 75 | 6 |
| I-9 | 51 | 2.5 | 0.2 | 75 | 68 | 123 | 6 |
| I-10 | 40 | 2.5 | 0.22 | 75 | 72 | 100 | 6 |
| I-11 | 31 | 2.5 | 0.21 | 75 | 70 | 75 | 6 |
| I-12 | 21 | 0.4 | 0.17 | 75 | 65 | 50 | 1 |
| I-13 | 20 | 1.0 | 0.25 | 75 | 75 | 49 | 2.5 |
| I-14 | 21 | 1.2 | 0.2 | 75 | 69 | 50 | 3 |
| I-15 | 22 | 3.3 | 0.22 | 75 | 71 | 52 | 8 |
| I-16 | 21 | 5.0 | 0.2 | 75 | 68 | 51 | 12 |
| I-17 | 20 | 6.3 | 0.21 | 75 | 70 | 48 | 15 |
| I-18 | 31 | 2.5 | 0.37 | 75 | 95 | 74 | 6 |
| I-19 | 31 | 2.5 | 0.39 | 75 | 98 | 74 | 6 |
| I-20 | 32 | 2.5 | 0.22 | 90 | 70 | 77 | 6 |

| Sample No. | Ratio of Si and C (atomic %) Primary phase Si:C | Ratio of Si and C (atomic %) Subphase Si:C | Characteristic evaluation Leak amount (ml) | Characteristic evaluation Coefficient of friction | Characteristic evaluation Four-point bending strength (MPa) |
|---|---|---|---|---|---|
| *I-1 | Within the range | Within the range | 210 | 0.1 | 160 |
| *I-2 | Within the range | Within the range | 204 | 0.1 | 170 |
| *I-3 | Within the range | Within the range | 200 | 0.1 | 180 |
| I-4 | Within the range | Within the range | 120 | 0.06 | 200 |
| I-5 | Within the range | Within the range | 96 | 0.05 | 208 |
| I-6 | Within the range | Within the range | 84 | 0.05 | 210 |
| I-7 | Within the range | Within the range | 65 | 0.03 | 205 |
| I-8 | Within the range | Within the range | 35 | 0.03 | 230 |
| I-9 | Within the range | Within the range | 54 | 0.04 | 210 |
| I-10 | Within the range | Within the range | 34 | 0.03 | 205 |
| I-11 | Within the range | Within the range | 34 | 0.02 | 201 |
| I-12 | Within the range | Within the range | 5 | 0.08 | 350 |
| I-13 | Within the range | Within the range | 6 | 0.03 | 300 |
| I-14 | Within the range | Within the range | 9 | 0.04 | 340 |

TABLE 1-continued

| | | | | | |
|---|---|---|---|---|---|
| I-15 | Within the range | Within the range | 10 | 0.03 | 230 |
| I-16 | Within the range | Within the range | 13 | 0.03 | 220 |
| I-17 | Within the range | Within the range | 25 | 0.01 | 190 |
| I-18 | Within the range | Within the range | 5 | 0.03 | 320 |
| I-19 | Within the range | Within the range | 5 | 0.03 | 330 |
| I-20 | Within the range | Within the range | 3 | 0.01 | 310 |

The samples marked "*" are out of the scope of the present invention.

As apparent from Table 1, in the samples of the invention (Nos. I-4 to I-20) in which the ratio of the spherical pores having a roundness of 6 μm or less and a pore diameter of 10 to 60 μm with respect to all pores having a pore diameter of 10 μm or more was 60% or more, the amount of leak from between the sliding surfaces 15a and 15b was as small as 120 ml or less and exhibited high seal properties than the samples (Nos. I-1 to I-3) in which the ratio of the spherical pores was less than 60%. Especially, in the samples (Nos. I-7 to I-19) in which the ratio of the spherical pores was 75%, the leak amount in the sliding surfaces was 65 ml or less, exhibiting higher seal properties.

The following results were obtained when comparing the samples in which the dispersion density of the spherical pores, the maximum diameter of the pores, and the porosity of the silicon carbide sintered body were changed in the samples (Nos. I-7 to I-19) in which the ratio of the spherical pores was 75%.

That is, it can be seen that in each of the samples (Nos. I-8 to I-19) in which the dispersion density of the spherical pores in the sliding surfaces is 60 pieces/mm² or more, the leak amount is as small as 54 ml or less, exhibiting higher seal properties than the sample (No. I-7) in which the dispersion density is less than 60 pieces/mm². When comparing the samples (Nos. I-8 to I-19) in which the dispersion density of the spherical pores in the sliding surfaces is 60 pieces/mm² or more, it can be seen that the samples (Nos. I-8 and I-10 to I-19) in which the maximum diameter of the individual pores is 100 μm or less, the leak amount is as small as 35 ml or less, exhibiting higher seal properties than the sample (No. I-9) in which the maximum diameter of the individual pores exceeds 100 μm.

In the samples (Nos. I-8 to I-11, I-13 to I-16, I-18 and I-19) in which the porosity of the silicon carbide sintered body is 2.5% to 12%, the coefficient of friction was as low as 0.04 or less, and the four-point bending strength was as high as 201 MPa or more. On the other hand, in the sample (No. I-12) in which the porosity was less than 2.5%, the coefficient of friction was as high as 0.08. In the sample (No. I-17) in which the porosity exceeded 12%, the coefficient of friction was low whereas the four-point bending strength was as low as 190 MPa.

Example II

<Sample Preparation>

Firstly, boron carbide powder, a pore forming agent, a pore dispersing agent and water, each having the amount of addition shown in Table 2, were added to silicon carbide powder, and put into a ball mill and mixed for 48 hours to make slurry. As a molding additive, binder was added and mixed to the slurry, followed by spray drying, thereby obtaining silicon carbide granules having a mean particle diameter of 80 μm.

As the above pore forming agent, suspension-polymerized non-crosslinked resin beads composed of previously ground polystyrene were used, which had a roundness of 4 μm or less and a diameter of 12 to 75 μm, and had the maximum diameter shown in Table 2. As the above pore dispersing agent, polycarboxylic acid sodium was used.

Subsequently, the mixed raw material was charged into a mold, and then pressed and molded at a pressure of 98 MPa in the thickness direction, thereby obtaining a molded body having a predetermined shape. The temperature of the obtained molded body was raised for 20 hours in nitrogen atmosphere, and held at 600° C. for 5 hours, then spontaneously cooled and defatted, thereby obtaining a defatted body.

The defatted body thus obtained was then held at the sintering temperature shown in Table 2 for 4 hours, thereby manufacturing Sample Nos. II-1 to II-10, each of which was a silicon carbide sintered body having a primary phase of silicon carbide and a subphase containing boron, silicon and carbon.

The content of boron with respect to 100% by mass of the sintered body of each sample was measured by ICP emission analysis method. The measured values are shown in Table 2. In present example, every boron was contained in the subphase.

The surface of each sample was ground to obtain a flat surface by a surface grinding machine, and roughly machined by a lapping machine made of alumina using diamond abrasive grains having a mean particle diameter of 3 μm. Subsequently, the surface thereof was mirror-finished by a lapping machine made of tin using the diamond abrasive grains having a mean particle diameter of 3 μm, so as to have an arithmetic mean height Ra of 0.98 μm or less, thereby obtaining a sliding surface. The subphase shape and the aspect ratio in the sliding surface were observed and measured at 5000 times magnification by a Scanning Electron Microscope. The measured values are shown in Table 2.

The ratio of spherical pores, and the ratios of Si and C (atomic %) in the primary phase and that of the subphase were measured in the same manner as in Example 1. The measured values and the measuring results are shown in Table 2.

<Evaluation>

The three-point bending strength, the Poisson's ratio, the Young's modulus, the coefficient of thermal expansion at 40° C. to 400° C. and the thermal conductivity in each sample were measured separately. Specifically, the three-point bending strength (S) was measured according to JIS R 1601-1995 (corresponding to ISO 14704: 2000 or ICS 81.060.30). The Poisson's ratio (v) and the Young's modulus (E) were measured according to JIS R 1602-1995 (corresponding to ISO 17561: 2002). The coefficient of thermal expansion (α) at 40° C. to 400° C. was measured according to JIS R 1618-2002 (corresponding to ISO 17562: 2001). The thermal conductivity (k) was measured according to JIS R 1611-1997.

The coefficient of thermal shock resistance R was calculated by applying the three-point bonding strength (S), the Poisson's ratio (v), the Young's modulus (E) and the coefficient of thermal expansion (α) at 40° C. to 400° C. thus obtained by the above measurements, to the following equation (3). Then, the coefficient of thermal shock resistance R' was calculated by applying the coefficient of thermal shock resistance R thus calculated and the thermal conductivity (k) thus obtained by the above measurement, to the following equation (4).

[Equation 3]

$$R = S \times (1-v)/(E \times \alpha) \quad (3)$$

where S is a three-point bending strength (Pa), "v" is a Poisson's ratio, E is a Young's modulus (Pa), and "α" is a coefficient of thermal expansion at 40° C. to 400° C. (×10$^{-6}$/K).

[Equation 4]

$$R' = R \times k \quad (4)$$

where "k" is a thermal conductivity (W/(m·K)).

Here, the coefficient of thermal shock resistance R is a coefficient that becomes an index of thermal shock resistance properties when heated and quickly cooled. The coefficient of thermal shock resistance R' is a coefficient that becomes an index of thermal shock resistance properties when heated and relatively gently cooled. It can be said that higher thermal shock resistance properties are attainable when these coefficients have higher values.

The measurement results of the thermal conductivity k and the coefficient of thermal shock resistance R' are as shown in Table 2.

The porosity of the silicon carbide sintered body constituting each sample was measured according to Archimedean method.

Separately, a ring-shaped molded body was manufactured, and then defatted and sintered, thereby obtaining a sintered body. The surface thereof was ground to obtain a flat surface by a surface grinding machine, and roughly machined by a lapping machine made of alumina. Subsequently, the surface thereof was mirror-finished by a lapping machine made of tin so as to have an arithmetic mean height Ra of 0.98 μm or less, thereby obtaining sample Nos. II-1 to II-10, each being an annular body having an outer diameter of 26 mm and an inner diameter of 19 mm. All of these samples were stationary rings 5a.

Subsequently, each of the rotary rings 5b prepared in Example I and each of the stationary rings 5a thus obtained (Sample Nos. II-1 to II-10) were brought into contact with the sliding surfaces 15a and 15b through the rotary shaft 6, and then slid under the same sliding conditions as in Example I, thereby measuring the coefficient of friction. The measured values are shown in Table 2.

TABLE 2

| Sample No. | Pore forming agent Maximum diameter (μm) | Pore forming agent Ratio (% by mass) | Pore dispersing agent Added ratio with respect to pore forming agent (% by mass) | Ratio of spherical pore (%) | Amount of addition of boron carbide (% by mass) | Sintering temperature (° C.) | Ratio of Si and C (atomic %) Primary phase Si:C | Ratio of Si and C (atomic %) Subphase Si:C |
|---|---|---|---|---|---|---|---|---|
| *II-1 | 38 | 1 | 0.2 | 65 | 2 | 2200 | Within the range | Outside the range |
| II-2 | 37 | 1 | 0.2 | 72 | 2 | 2100 | Within the range | Within the range |
| II-3 | 40 | 1 | 0.2 | 62 | 2 | 1900 | Within the range | Within the range |
| II-4 | 34 | 1 | 0.2 | 68 | 0.5 | 1850 | Within the range | Within the range |
| II-5 | 30 | 1 | 0.2 | 69 | 1 | 1850 | Within the range | Within the range |
| II-6 | 38 | 1 | 0.2 | 73 | 2 | 1850 | Within the range | Within the range |
| II-7 | 37 | 1 | 0.2 | 68 | 3 | 1850 | Within the range | Within the range |
| II-8 | 36 | 1 | 0.2 | 74 | 5 | 1850 | Within the range | Within the range |
| II-9 | 39 | 1 | 0.2 | 63 | 2 | 1825 | Within the range | Within the range |
| II-10 | 41 | 1 | 0.2 | 70 | 2 | 1800 | Within the range | Within the range |

| Sample No. | Subphase Shape | Subphase Content of boron (% by mass) | Subphase Aspect ratio | Evaluation Porosity (%) | Evaluation Thermal conductivity (W/(m·k)) | Evaluation Coefficient of thermal shock resistance R' (W/m) | Evaluation Coefficient of friction |
|---|---|---|---|---|---|---|---|
| *II-1 | Columnar | 0.4 | 6.2 | 1.2 | 105 | 28000 | 0.17 |
| II-2 | Granular | 0.25 | 2.8 | 1.5 | 160 | 40000 | 0.14 |
| II-3 | Granular | 0.25 | 2.5 | 1.7 | 210 | 51500 | 0.09 |
| II-4 | Granular | 0.1 | 1.9 | 1.8 | 175 | 41000 | 0.09 |
| II-5 | Granular | 0.2 | 1.9 | 1.8 | 194 | 48500 | 0.1 |
| II-6 | Granular | 0.25 | 2 | 1.8 | 185 | 43000 | 0.11 |
| II-7 | Granular | 0.3 | 2 | 1.8 | 180 | 42500 | 0.11 |
| II-8 | Granular | 0.4 | 2.8 | 1.8 | 160 | 40500 | 0.12 |
| II-9 | Granular | 0.25 | 1.6 | 2 | 186 | 44000 | 0.09 |
| II-10 | Granular | 0.25 | 1.2 | 2.2 | 205 | 50500 | 0.08 |

The sample marked "*" is out of the scope of the present invention.

As apparent from Table 2, in Sample Nos. II-2 to II-10 of the invention, the subphase thereof was granular and had a high aspect ratio, and hence they had a high thermal conductivity and a high coefficient of thermal shock resistance R', exhibiting high thermal conductivity and high thermal shock resistance properties.

Particularly, Sample Nos. II-3 to II-7, II-9 and II-10, in which the aspect ratio was 2.5 or less, had a higher thermal conductivity and a higher coefficient of thermal shock resistance R'.

When comparison among Sample Nos. II-4 to II-8 having different contents of boron was made, Sample Nos. II-5 to II-7, in which the content of boron was 0.2 to 0.3% by mass, had a higher thermal conductivity and a higher coefficient of thermal shock resistance R' than Sample Nos. II-4 and II-8, in which the content of boron was outside the above-mentioned range.

On the other hand, in Sample No. II-1 being outside the scope of the invention, a different phase not being the composition of the subphase of the invention was generated, exhibiting a columnar shape. Since the different phase had a higher aspect ratio, this sample had a low thermal conductivity and a low coefficient of thermal shock resistance R', exhibiting low thermal conductivity and low thermal shock resistance properties.

Example III

<Sample Preparation>

Firstly, 2.5% by mass of boron carbide powder, a pore forming agent, a pore dispersing agent and water, each having the amount of addition shown in Table 3, were added to silicon carbide powder, and put into a ball mill and mixed for 48 hours to make slurry. As a molding additive, binder was added and mixed to the slurry, followed by spray drying, thereby preparing silicon carbide granules having a mean particle diameter of 80 μm.

As the above pore forming agent, suspension-polymerized non-crosslinked resin beads composed of previously ground polystyrene were used, which had a roundness of 4 μm or less and a diameter of 12 to 75 μm, and had the maximum diameter shown in Table 3. As the above pore dispersing agent, polycarboxylic acid sodium was used.

Subsequently, the mixed raw material was charged into a mold and pressed and molded at a pressure of 98 MPa in the thickness direction, thereby obtaining a molded body having a predetermined shape.

The temperature of the obtained molded body was raised for 20 hours in nitrogen atmosphere, and held at 600° C. for 5 hours, then spontaneously cooled and defatted, thereby obtaining a defatted body. The defatted body thus obtained was then held at 2000° C. for 4 hours and sintered to obtain Sample Nos. III-1 to III-6, each being a sintered body.

The surface of each sample was then ground to obtain a flat surface by a surface grinding machine, and roughly worked by a lapping machine made of alumina using diamond abrasive grains having a mean particle diameter of 3 μm. Subsequently, the surface thereof was mirror-finished by a lapping machine made of tin using the diamond abrasive grains having a mean particle diameter of 3 μm, so as to have an arithmetic mean height Ra of 0.98 μm or less, thereby obtaining a sliding surface. The subphase shape in the sliding surface was observed at 5000 times magnification by a Scanning Electron Microscope. No columnar subphase was observed in each sample, and only the granular subphase was observed.

The ratio of spherical pores, and the ratios of Si and C (atomic %) in the primary phase and that of the subphase were measured in the same manner as in Example 1. The measured values and the measuring results are shown in Table 3. The porosity of each sample was found according to Archimedean method.

The three-point bending strength, the Poisson's ratio, the Young's modulus, the coefficient of thermal expansion at 40° C. to 400° C. and the thermal conductivity in each sample were measured in the same method as described in Example II, and the coefficient of thermal shock resistance R' defined by the equation (4) was found.

Separately, a ring-shaped molded body was manufactured and defatted and sintered, thereby obtaining a sintered body. The surface thereof was ground to obtain a flat surface by a surface grinding machine, and roughly machined by a lapping machine made of alumina. Subsequently, the surface thereof was mirror-finished by a lapping machine made of tin so as to have an arithmetic mean height Ra of 0.98 μm or less, thereby obtaining samples, each being an annular body having an outer diameter of 26 mm and an inner diameter of 19 mm. All of these samples were stationary rings 5a.

Thereafter, they are slid under the same conditions as in Example II, thereby measuring the coefficient of friction during sliding. The measured values are shown in Table 3.

TABLE 3

| Sample No. | Pore forming agent Maximum diameter (μm) | Pore forming agent Ratio (% by mass) | Pore dispersing agent Added ratio with respect to pore forming agent (% by mass) | Ratio of spherical pore (%) | Ratio of Si and C (atomic %) Primary phase Si:C | Ratio of Si and C (atomic %) Subphase Si:C | Porosity (%) | Evaluation Thermal conductivity (W/(m·k)) | Evaluation Coefficient of thermal shock resistance R' (W/m) | Coefficient of friction |
|---|---|---|---|---|---|---|---|---|---|---|
| III-1 | 37 | 0.2 | 0.25 | 80 | Within the range | Within the range | 2 | 192 | 49000 | 0.15 |
| III-2 | 43 | 0.5 | 0.25 | 69 | Within the range | Within the range | 2.5 | 185 | 45000 | 0.13 |
| III-3 | 30 | 6 | 0.25 | 72 | Within the range | Within the range | 3 | 177 | 41500 | 0.09 |
| III-4 | 48 | 9 | 0.25 | 68 | Within the range | Within the range | 8 | 165 | 32000 | 0.07 |
| III-5 | 38 | 10 | 0.25 | 66 | Within the range | Within the range | 12 | 158 | 25000 | 0.06 |
| III-6 | 43 | 12 | 0.25 | 61 | Within the range | Within the range | 15 | 143 | 20500 | 0.05 |

As apparent from Table 3, Sample No. III-1 having a porosity of less than 2.5% is good because of a high thermal conductivity and a high coefficient of thermal shock resistance R', however, the coefficient of friction is high. Sample No. III-6 having a porosity exceeding 15% is good because of a low coefficient of friction, however, both the thermal conductivity and the coefficient of thermal shock resistance R' are low.

On the other hand, Samples No. III-2 to III-5 having a porosity of 2.5% to 12% are suitable because the thermal conductivity, the coefficient of thermal shock resistance R' and the coefficient of friction are well balanced.

The invention claimed is:

1. A sliding member comprising:
   a primary phase; and
   a subphase,
   wherein the primary phase comprises silicon carbide as a main component, and the subphase has a different composition from the primary phase and comprises boron, silicon and carbon;
   wherein a ratio of spherical pores having a roundness of 6 μm or less and a pore diameter of 10 to 60 μm with respect to all pores having a pore diameter of 10 μm or more in the sliding surface is 75% to 90%;
   wherein a dispersion density of the spherical pores is 60 pieces/mm² or more; and
   wherein a maximum diameter of each pore in the sliding surface is 100 μm or less,
   wherein the subphase in the silicon carbide sintered body is a granular crystal phase dotted among a plurality of the primary phases, and
   wherein the aspect ratio of the subphase is 2.5 or less.

2. The sliding member according to claim 1, wherein the porosity of the silicon carbide sintered body is 2.5% to 12%.

3. The sliding member according to claim 1, wherein the subphase in the silicon carbide sintered body is smaller than the particle diameter of the primary phase adjacent thereto.

4. The sliding member according to claim 1, wherein the content of the boron is 0.2 to 0.3% by mass with respect to 100% by mass of the silicon carbide sintered body.

5. A method of manufacturing a sliding member according to claim 1, comprising the steps of:
   a blending step of obtaining a raw material by adding and mixing a boron carbide powder, a pore forming agent and a pore dispersing agent for dispersing the pore forming agent, into a silicon carbide powder, said silicon carbide powder being a main ingredient;
   a molding step of obtaining a molded body by obtaining a molding raw material by adding binder to the raw material, and then charging the molding raw material into a predetermined mold, followed by press molding; and
   a sintering step of obtaining a silicon carbide sintered body by sintering the molded body at 1800° C. to 2000° C.

6. The method of manufacturing a sliding member according to claim 5, wherein the pore dispersing agent comprises an anionic interface activating agent.

* * * * *